(No Model.) 5 Sheets—Sheet 1.
F. STEPHAN.
MACHINE FOR CUTTING BEET ROOTS.
No. 489,338. Patented Jan. 3, 1893.
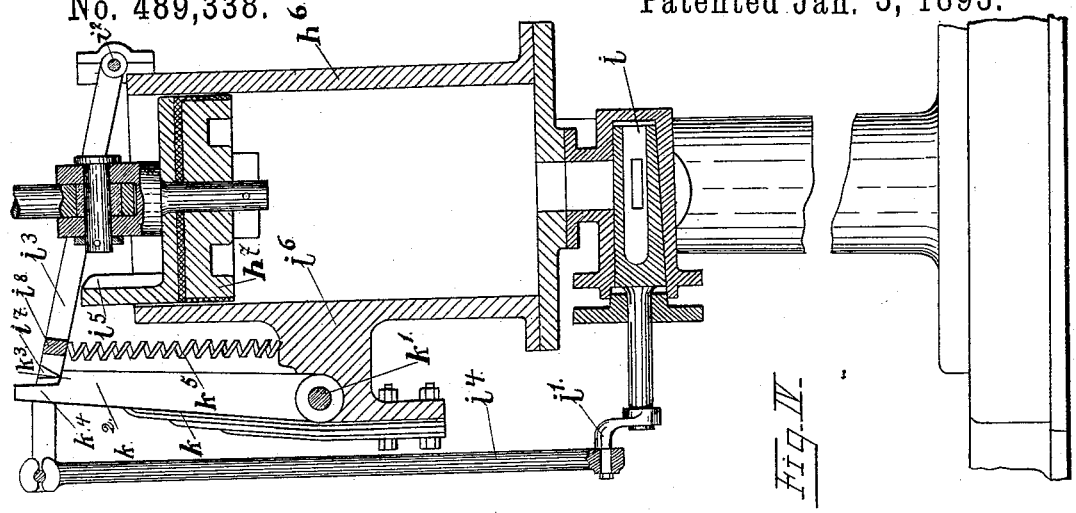
Fig. II.
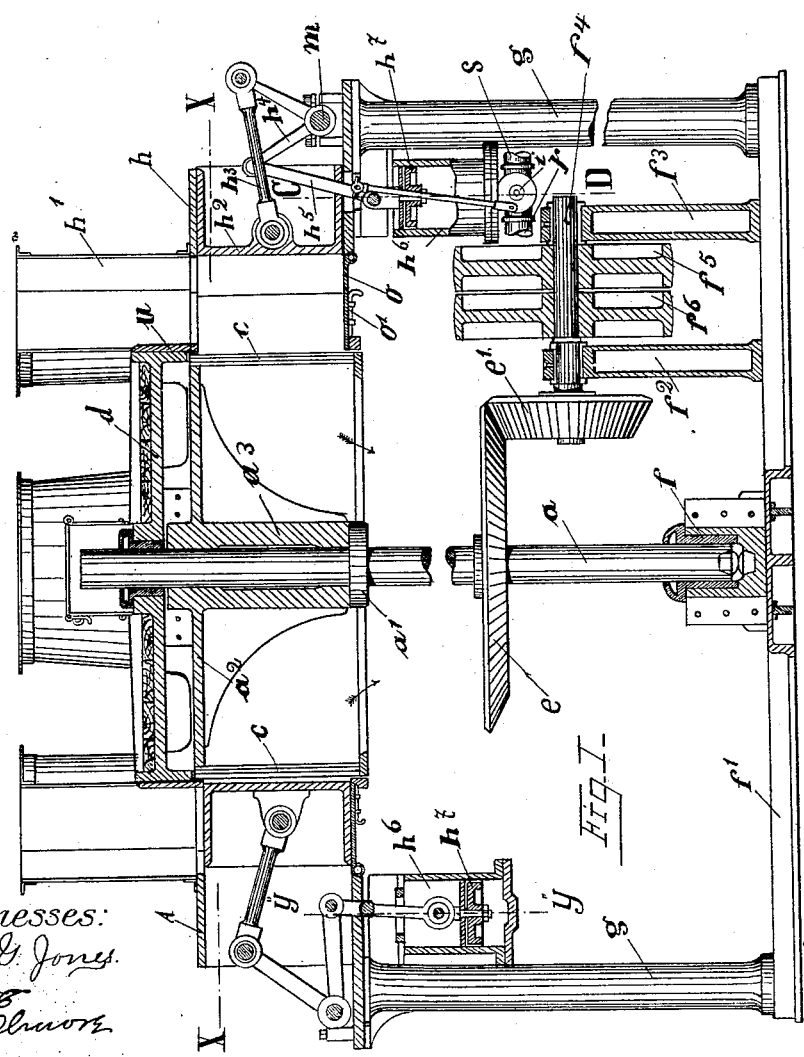
Fig. I.
Witnesses:
J. G. Jones.
F. H. Elmore.
Inventor:
Franz Stephan
By his Atty
P. T. Dodge

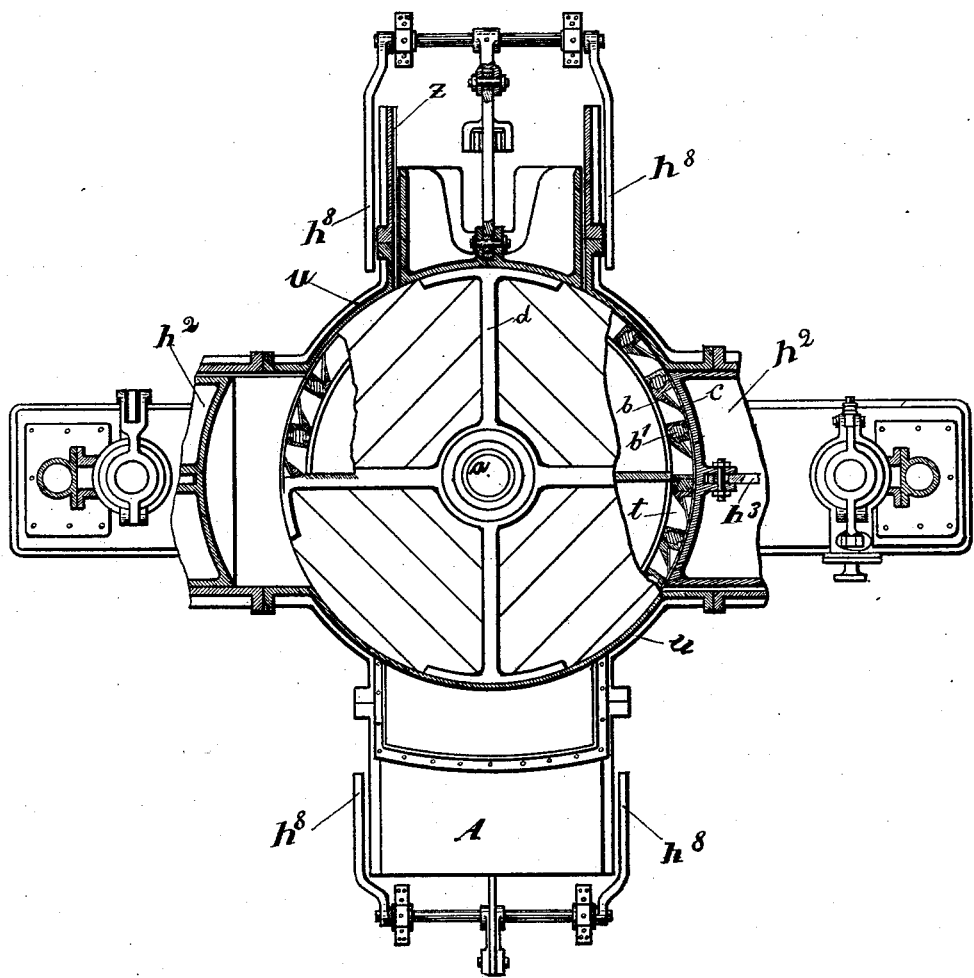

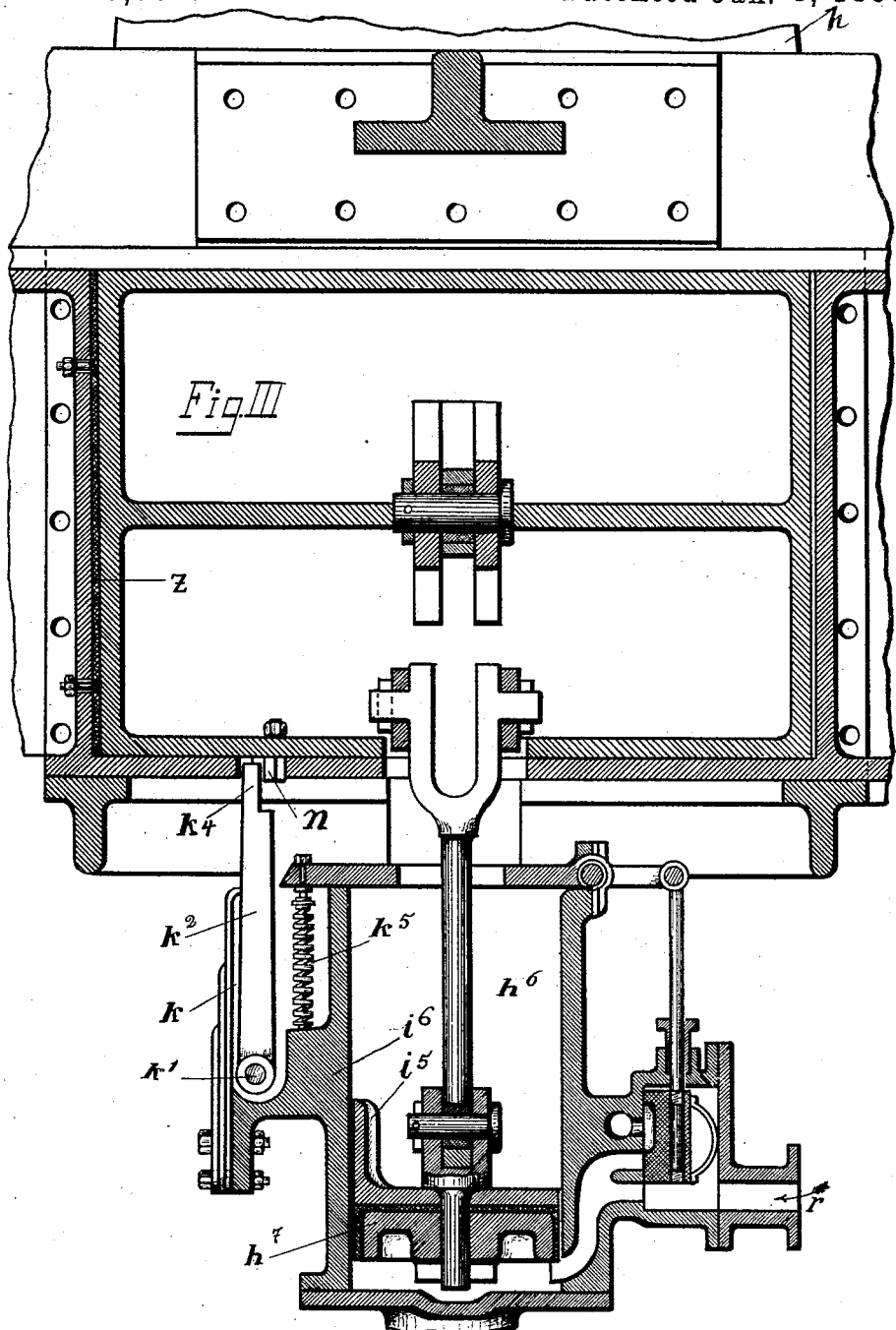

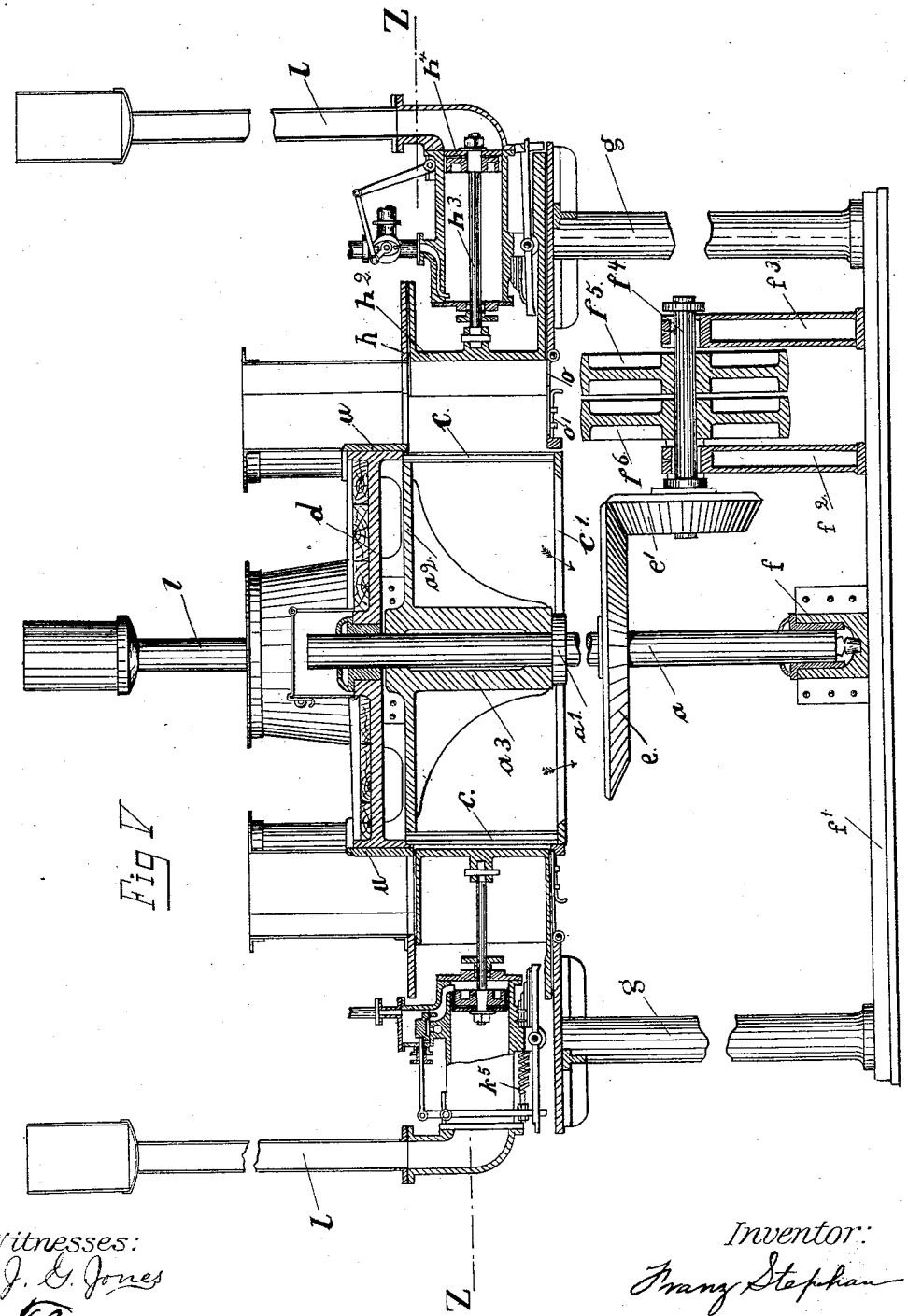

(No Model.) 5 Sheets—Sheet 5.
F. STEPHAN.
MACHINE FOR CUTTING BEET ROOTS.
No. 489,338. Patented Jan. 3, 1893.
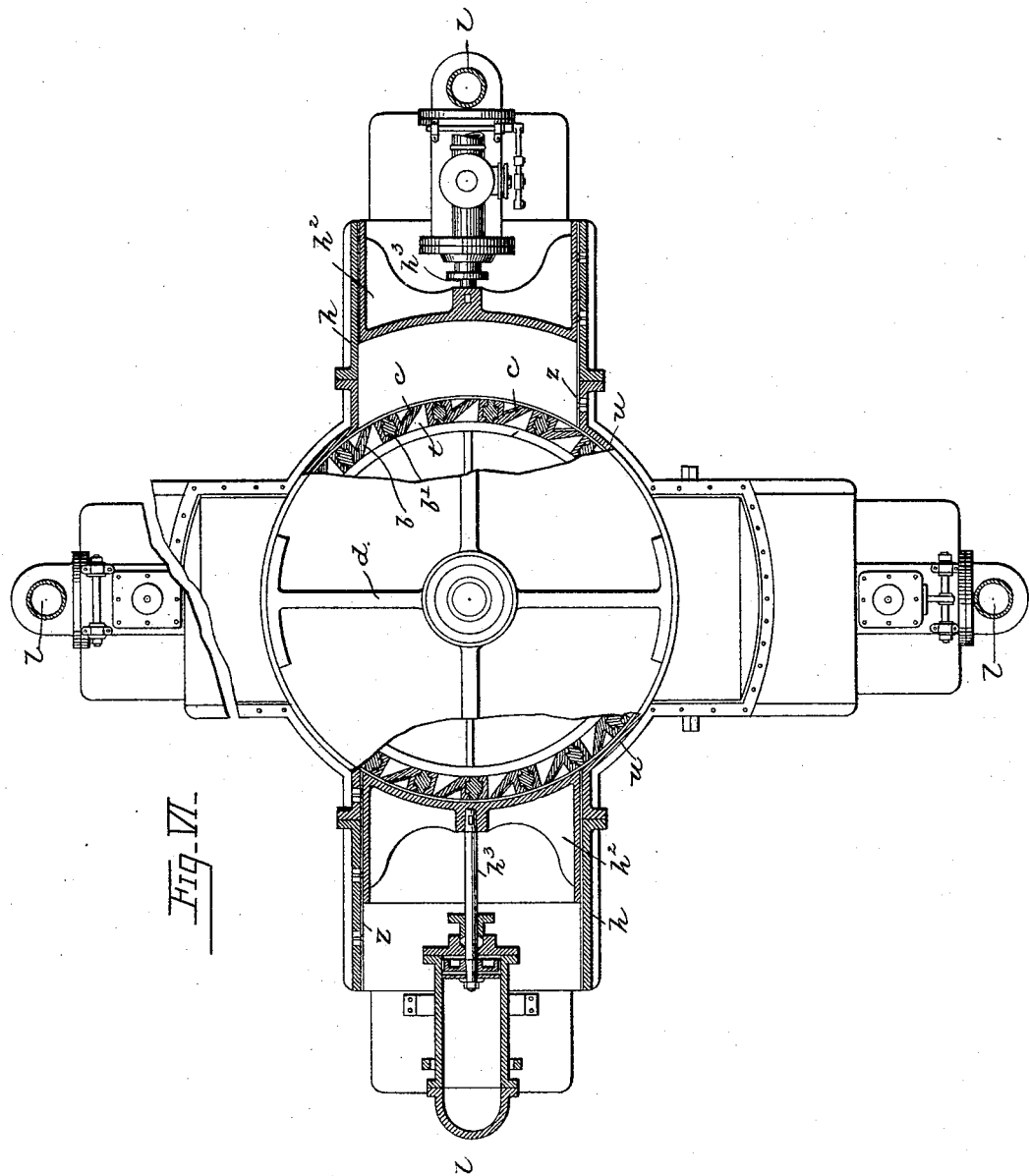
Fig. VI.
Witnesses
Raymond F. Barnes.
William H. Shipley.
Inventor
Franz Stephan
By P. T. Dodge
Attorney

UNITED STATES PATENT OFFICE.

FRANZ STEPHAN, OF WERCHNIATSCHKA, RUSSIA.

MACHINE FOR CUTTING BEET-ROOTS.

SPECIFICATION forming part of Letters Patent No. 489,338, dated January 3, 1893.

Application filed November 30, 1891. Serial No. 413,622. (No model.)

*To all whom it may concern:*

Be it known that I, FRANZ STEPHAN, of Werchniatschka, in the Empire of Russia, have invented a new and useful Machine for 5 Cutting Beet-Roots, of which the following is a specification, reference being had therein to the accompanying drawings.

This invention relates to a machine for cutting beetroots, comprising one or more automatic root pressers or feeders, which are set in motion by any suitable power, for example, by a column of liquid or by air pressure.

The invention is illustrated in the annexed drawings and described in the following explanation:—

Figure I is a sectional elevation of an apparatus provided with the improvements, according to this invention, and in which the root presser is set in operation by means of a column of liquid, acting on weighted levers, which serve to press forward the supply of roots to the cutting cylinder. Fig. II is a sectional plan of the apparatus taken at the line $x-x$ Fig. I. Fig. III is a sectional side elevation to a larger scale of the apparatus, taken at the line $y\ y$ Fig. I, and Fig. IV is a section taken at C D Fig. I. Fig. V is a sectional elevation of a modification of the apparatus, taken through the root cutting devices and showing the modes of action of the column of liquid. Fig. VI is a sectional plan of the apparatus, taken at the line $z\ z$, Fig. V.

With reference to the drawings it will be seen that the cutting drum is fixed and held on the axis or spindle $a$ by a collar $a'$, the periphery of the drum being provided with incisions. The knife cases $b$ with their knives are placed in these incisions from above. The cutting-drum runs in the casing $u$. The adjustable counter knives are marked $z$, these prevent the uncut portions of the roots from getting between the drum and the casing. Above the drum there is placed the support $d$ of the case $u$ and the bearing of the drum spindle. $a$. On the spindle $a$ below the drum there is fixed a bevel wheel $e$, and the lower end of the spindle $a$ runs in the bearing $f$ on the base plate $f'$, on which the bearing blocks $f^2$, $f^3$ for the driving shaft $f^4$ are placed. The driving shaft is provided, with the bevel pinion $e'$, which gears with and works the bevel wheel $e$, and with the fast and loose driving belt pulleys $f^5$ and $f^6$. On the base plate $f'$ are provided the columns $g$ which support the upper part of the apparatus.

The root feeding devices are all placed at the same height as the cutting-drum and each consists of a holder $h$ into which the roots drop from a hopper $h'$. In the holder $h$ there works the presser $h^2$. In the arrangement shown in Fig. I the presser $h^2$ is connected by the rod $h^3$ with the bell crank lever $h^4$ the rod $h^5$ and the piston $h^7$ of the cylinder $h^6$, the shaft $m$ of the lever $h^4$ is continued out on both sides and is provided with arms $h^8$ serving as weights. The actuating fluid enters the cylinder $h^6$ through the pipe $r$ and exhausts through the pipe $s$, the cock $i$ is placed on the cylinder $h^6$ between the pipes $r$ and $s$ and is opened and closed by the lever $i'$, which is turned by the lever $i^3$ and the rod $i^4$. The piston $h^7$ is provided with a projection $i^5$ and the cylinder $h^6$ carries on the bracket $i^6$, a rocking lever $k^2$, acted on by a spring $k$, having a catch $k^3$, against which the lever $i^3$ with its projection $i^7$ lies a projection $k^4$ extends upward from the lever $k^2$. The lever $i^3$ is acted upon by a spiral spring $k^5$ fixed to the bracket $i^6$. The lever $i^3$ is also provided with a pin $i^8$ for the lever $k^2$.

The bottom of the root holder $h$ is arranged as a drop down door which can be made fast by means of the bolt $o^L$.

The mode of action of the root cutting machine is as follows: When not at work the root pressers $h^2$ lie against the cutting-drum and thereby close the outlets for the roots from the hoppers $h'$. After the root hopper $h'$ has been filled with roots the liquid supply pipe $r$ is opened, whereupon the liquid passes through the cock $i$ into the cylinder $h^6$ and raises the piston and thereby through the lever $h^4$ draws out the root pressers $h^2$ and the weighted arms $h^8$ are raised. The presser $h^2$ being thus drawn out from the cutting-drum the roots fall from the hopper $h'$ into the holder $h$ and between the cutting-drum and the presser $h^2$. The return stroke of the presser $h^2$ is caused by the weighted arms $h^8$, the cock $i$ being reversed by the piston $h^7$ through the projection $i^5$ raising the lever $i^3$ so that its catch $i^7$ engages with the catch $k^4$ of the lever $k^2$. The raising of the lever causes by means of the connecting rod $i^4$ the turning of the cock $i$, so that the supply is shut off from the pipe $r$ and the exhaust pipe $s$ is opened. Now the weighted arms $h^8$ cause the lever $h^4$ to have a return stroke and thereby the presser $h^2$ presses upon the roots in the holder $h$ and forces them against the knives on the cutting-drum. The cutting-drum which receives motion from the bevel gear $e\ e'$ cuts the roots which are pressed against it to pieces and they leave the drum in the direction shown by the arrow. When the roots lying between the presser $h^2$ and the cutting-drum are cut to pieces and the root presser $h^2$ almost touches the drum the lever $k^2$ which is in connection with the presser detaches itself from the lever $i^3$ which acted upon by the spring $k$ is brought down thus opening, the fluid supply cock $i$, so that the liquid under pressure again enters the cylinder $h^6$, and the process just described is repeated.

Should by chance any object detrimental to the knives get between the cutting-drum and the roots it can be got rid of by raising the lever $i^3$ from the lever $k^2$ and reversing the cock and drawing back the root presser. To prevent the root pressure remaining in an open position the fluid outlet $s$ is closed. The door $o$ is opened and the contents of the holder $h$ emptied out.

A modification of the apparatus is shown in Figs. 5 and 6: In this case the forward movement of the presser $h^2$ is done by means of a column of liquid from the pipes $l$. The driving cylinder $h^6$ is arranged in line with the presser $h^2$, the piston rod $h^3$ being directly connected to the presser $h^2$. The pressure can be regulated by increasing or reducing the quantity of water in the pipes $l$, the supply from which to the cylinders $h^6$ is regulated either by a cock as shown at the right hand side of Figs. 4 and 5 or by a slide valve as shown at the left hand side of Figs. 4 and 5 and in Fig. 3.

What I claim and desire to secure by Letters Patent of the United States is:

1. A root cutting apparatus comprising a rotating cutting-drum, root hoppers $h'$, root holders $h$ surrounding said cutting drum and pressers $h^2$ adapted to press and feed the roots against the knives of the cutting-drum as set forth.

2. A root cutting apparatus comprising a rotating cutting-drum, root hoppers, root holders, and root pressers or feeders as set forth, and an operating cylinder to work the root presser, the piston of which operates said root presser by means of a rocking bell crank lever in such a manner that after the feeding stroke the root presser is drawn away from the cutting-drum to permit of a fresh supply of roots, the forward or feeding stroke of the root presser being produced by weighted levers or their equivalent.

3. In a beet-cutting machine the combination with the cylinder $h^6$, its piston $h^7$ provided with the projection $i^5$, and the fluid supply and exhaust pipes, of the cock $i$ and its lever $i'$, the lever $i^3$, the rod $i^4$ connecting said levers, whereby, when the piston reaches the end of its stroke the fluid supply is cut off and the exhaust opened.

4. In a beet-cutting machine the combination with the cylinder $h^6$, its piston $h^7$ provided with the projection $i^5$, and the fluid supply and exhaust pipes, of the cock $i$ and its lever $i'$, the lever $i^3$, the rod $i^4$ connecting said levers, and the spring catch $k^2$, whereby when the piston reaches the end of its stroke the fluid supply is cut off, the exhaust opened, and the cock locked in position.

5. In a beet-cutting machine, the combination of the cutting-drum, the beet-holding chambers at the sides thereof, the reciprocating plungers in said chambers, for feeding the beets forward, and a fluid-pressure apparatus for operating said plungers.

In witness whereof I have hereunto set my hand in presence of two witnesses.

FRANZ STEPHAN.

Witnesses:
ADOLPHE FISCHER,
TH. WALDAPFEL.